US012553907B2

(12) United States Patent
Jiang et al.

(10) Patent No.: US 12,553,907 B2
(45) Date of Patent: Feb. 17, 2026

(54) WHOLE BLOOD CONTROL SAMPLE SYSTEMS AND METHOD OF PREPARING AND USING THE SAME

(71) Applicant: Perosphere Technologies Inc., Danbury, CT (US)

(72) Inventors: Xuan Jiang, Clarksburg, MD (US); Lirong Chen, Clarksburg, MD (US); Yongchen Wang, Rahway, NJ (US); Dardan Osmani, Chappaqua, NY (US); Stefan Zappe, Danbury, CT (US); Randy Byrd, Inman, SC (US); Sasha H. Bakhru, Ridgefield, CT (US)

(73) Assignee: Perosphere Technologies Inc., Danbury, CT (US)

( * ) Notice: Subject to any disclaimer, the term of this patent is extended or adjusted under 35 U.S.C. 154(b) by 651 days.

(21) Appl. No.: 17/995,930

(22) PCT Filed: Apr. 22, 2021

(86) PCT No.: PCT/US2021/028615
§ 371 (c)(1),
(2) Date: Oct. 11, 2022

(87) PCT Pub. No.: WO2021/216851
PCT Pub. Date: Oct. 28, 2021

(65) Prior Publication Data
US 2023/0204606 A1 Jun. 29, 2023

Related U.S. Application Data

(60) Provisional application No. 63/014,852, filed on Apr. 24, 2020.

(51) Int. Cl.
*G01N 33/96* (2006.01)
*G01N 33/86* (2006.01)
(52) U.S. Cl.
CPC ......... *G01N 33/96* (2013.01); *G01N 2333/81* (2013.01); *G01N 2496/05* (2013.01); *G01N 2496/25* (2013.01)
(58) Field of Classification Search
CPC .... G01N 33/49; G01N 33/4905; G01N 33/86; G01N 33/96; G01N 2333/81; G01N 2496/05; G01N 2496/25; Y10T 436/10; Y10T 436/101666; Y10T 436/106664; Y10T 436/108331
USPC ......... 436/8, 10, 16, 18, 63, 69; 435/13, 23; 422/73
See application file for complete search history.

(56) References Cited

U.S. PATENT DOCUMENTS

| 4,731,330 | A | | 3/1988 | Hill et al. |
| 5,716,795 | A | | 2/1998 | Matschiner et al. |
| 5,721,140 | A | * | 2/1998 | Speck ..................... G01N 33/96 |
| | | | | 436/16 |
| 5,939,325 | A | * | 8/1999 | Speck ..................... C12Q 1/56 |
| | | | | 436/16 |
| 6,733,985 | B1 | * | 5/2004 | Lee ........................ G01N 33/86 |
| | | | | 562/561 |
| 9,910,053 | B2 | | 3/2018 | Bakhru et al. |
| 10,534,006 | B2 | | 1/2020 | Bakhru et al. |
| 2003/0104508 | A1 | | 6/2003 | Gempeler et al. |
| 2006/0234325 | A1 | | 10/2006 | Calatzis et al. |
| 2008/0032405 | A1 | | 2/2008 | Ho et al. |
| 2020/0063184 | A1 | | 2/2020 | Zaman et al. |

FOREIGN PATENT DOCUMENTS

| JP | 5-500105 A | 1/1993 |
| JP | 2003-517610 A | 5/2003 |
| JP | 2011-69718 A | 4/2011 |
| JP | 2017-532581 A | 11/2017 |
| WO | 91/01497 A1 | 2/1991 |
| WO | 01/07921 A2 | 2/2001 |
| WO | 01/44819 A2 | 6/2001 |
| WO | 2016/061611 A1 | 4/2016 |

OTHER PUBLICATIONS

First Office Action in Chinese Application No. 202180030107.9 (Mar. 2025).
International Search Report in International Application No. PCT/US2021/028615 (Sep. 2021).
Written Opinion in International Application No. PCT/US2021/028615 (Sep. 2021).
Jack Ansell et al., "A Novel Whole Blood Point-of-Care Coagulometer to Measure the Effect of Direct Oral Anticoagulants and Heparins," 45(3) Semin Thromb Hemost. 259-263 (2019).
Erwin Chargaff et al., "Studies on the Chemistry of Blood Coagulation. III. The Chemical Constituents of Blood Platelets and Their Role in Blood Clotting, with Remarks on the Activation of Clotting by Lipids," 116 J. Biol. Chem. 237-251 (1936).
F. Markwardt et al., Comparative Studies on the Inhibition of Trypsin, Plasmin, and Thrombin by Derivatives of Benzylamine and Benzamidine, 6 European J. Biochem. 502-506 (1968).
Francesca Canalias et al., "Preparation of Canine C-Reactive Protein Serum Reference Material: A Feasibility Study," 47 Vet. Clin. Pathol. 122-129 (2018).
Notification of Reason(s) for Rejection in Japanese Application No. 2022-565581 (Mar. 2025).
Notification of Reasons for Rejection in Japanese Application No. 2022-565581 (Oct. 2025).

* cited by examiner

*Primary Examiner* — Maureen Wallenhorst
(74) *Attorney, Agent, or Firm* — Venable LLP

(57) ABSTRACT

The preparation and use of systems to provide surrogate whole blood controls using coagulation modifiers to simulate human whole blood in coagulation assays are disclosed.

23 Claims, 1 Drawing Sheet

WHOLE BLOOD CONTROL SAMPLE SYSTEMS AND METHOD OF PREPARING AND USING THE SAME

CROSS-REFERENCE TO RELATED APPLICATION

This application claims the benefit of U.S. Provisional Application No. 63/014,852, filed Apr. 24, 2020, which is incorporated herein by reference in its entirety.

BACKGROUND OF THE INVENTION

Field of the Invention

This invention is directed to the preparation and use of systems to provide surrogate whole blood controls to simulate human whole blood in coagulation assays.

Related Background Art

In the United States, the number of patients requiring anticoagulation annually numbers in the millions; upwards of 600,000 patients with thromboembolic events or pulmonary embolism, (CDC Fast Stats 2012) and over 1 million joint replacement procedures (knee and hip), (CDC Statistics 2010) necessitate prophylactic post-operative anticoagulation, and most of the 2.66 million patients with atrial fibrillation will also be prophylactically anticoagulated. (CDC Atrial Fibrillation Fact Sheet)

Anticoagulation is time consuming and problematic for both physicians and patients. The traditional anticoagulants (heparin and warfarin) have a long history of successful clinical use, with an accepted risk of substantial bleeding. (Palareti G 2011, FDA Safety Alert 2012) Due to the incidence of major bleeding associated with the traditional anticoagulants, demand for new therapeutic anticoagulants has been met with the introduction of low molecular weight heparin (LMWH) products and selective oral inhibitors of clotting factor IIa and Xa. Although the non-vitamin K oral anticoagulants (NOACs) have several advantages including rapid therapeutic effectiveness, ease of dosing, and lack of monitoring requirements, each is associated with risk of major bleeding. (ISMP 2012]

In response, point of care (POC) coagulometers such as described in U.S. Pat. Nos. 9,910,053 and 10,534,006, the disclosure of which is incorporated by reference herein in their entirety, have been developed. For example, Perosphere Technologies Inc. (Danbury, CT) has developed a POC Coagulometer that is a handheld, battery-operated device that uses disposable, microfluidic cuvettes made of silicon and glass for clotting time measurements. Clotting is initiated through contact of a blood sample with the glass surfaces inside a cuvette. The coagulometer employs continuous near-infrared (IR) (1,300 nm) spectroscopy to determine the time elapsed between blood sample addition into the test strip and fibrin assembly, the final step in the clotting cascade. Adding blood to the test strip causes a reduction in IR transmission due to the absorption of light by the blood, which initiates the automatic measurement of clotting time. Initially, the IR transmission signal rises with time as red blood cells settle and aggregate allowing for a less-blocked light path, i.e., reduced opacity between the IR emitter and detector. Activation within the test strip occurs by exposure of the blood to the glass surface, which activates clotting via the intrinsic pathway beginning with Factor XII. Once the coagulation cascade proceeds to the point of fibrinogen conversion to fibrin as mediated by Factor IIa, fibrin begins to assemble. The assembled fibrin network blocks the IR light path, i.e., increasing opacity, yielding a reduction in IR transmission. The point at which fibrin assembles and registers as a global maximum, or peak, in the IR transmission over time plot, is reported as clotting time. Since activation occurs at the beginning of the intrinsic pathway and clot detection occurs at the end of the common pathway, the POC Coagulometer has shown sensitivity to a wide range of anticoagulants including edoxaban, rivaroxaban, apixaban, dabigatran, unfractionated heparin and low molecular heparin (LMWH).

As a point-of-care diagnostic device, Perosphere Technologies' PoC Coagulometer requires freshly drawn human whole blood for clotting time measurement. Fresh human whole blood, however, is labile in nature, thereby unable to be aliquoted, stored and transferred. Therefore, there exists a need for preparation of surrogate whole blood controls for the evaluation of the precision and validation on a routine basis of the performance of POC coagulometers, such as those described in U.S. Pat. Nos. 9,910,053 and 10,534,006, and particularly the POC coagulometer developed by Perosphere Technologies Inc. It is an object of the invention to prepare surrogate whole blood controls sample systems, that when used, can mimic the clotting characteristics of fresh human whole blood and mediate clotting times similar to human whole blood anticoagulated with different anticoagulants, and which also possess excellent stability for storage and transportation.

SUMMARY OF INVENTION

Preparations of surrogate whole blood control systems and their use to provide whole blood control samples are described herein. A typical surrogate whole blood control system comprises three components: a lyophilizate prepared with animal red blood cells and plasma, a diluent solution and activation solution, which when combined provides a whole blood control sample. In particular, a whole blood control sample system of this invention comprises: (a) at least one lyophilizate comprising, (i) fixed red blood cells sourced from one or more mammalian species; (ii) and plasma sourced from one or more mammalian species; (b) at least one diluent; (c) and at least one activation solution, wherein at least one of the lyophilizate, diluent or activation solution contains a coagulation modulator. The advantageous whole blood control system of the invention differs from typical whole blood control systems which comprise only two components, i.e. a lyophilizate prepared with mammalian red blood cells and plasma, and a diluent solution containing activators to rehydrate the blood mixture and restart the clotting cascade. Significantly, the whole blood control system of the invention separates the diluent and activator, and most preferably the lyophilizate and diluent are substantially free of coagulation activator. This allows the lyophilizate to be more completely rehydrated with the diluent compared to prior art systems and thus provides a more precise and consistent whole blood control system.

In one embodiment, red blood cells from a single mammalian species is fixed with crosslinking reagents including aliphatic aldehydes. The fixation of red blood cells helps to improve the stability of red blood cells during lyophilization and long-term storage. The fixed red blood cells are mixed with mammalian plasma from a single species or a mixture of plasma from different species with differing clotting times. The red blood cell/plasma mixture is then lyophilized to obtain the lyophilizate. In some embodiments, when plasma mixture from different species is used, the mixing ratios of different plasma can be varied to achieve different clotting times of whole blood controls. In some embodiments, mammalian fibrinogen can be added into red blood cell/plasma mixture to change the clotting time of surrogate whole blood control. In some embodiments, activators including thromboplastin, cephalin or kaolin is added to the red blood cell/plasma mixture to promote activation of clotting. In other embodiments, the activation solution comprises calcium chloride and a coagulation modulator as rabbit brain cephalin and/or such serine protease inhibitors including, for example, trypsin inhibitors such as benzamidine. By varying the concentration of calcium chloride or the coagulation modulator protease inhibitors, the clotting time of the surrogate whole blood control can be adjusted to provide a range of values which represent those obtained from whole blood samples taken from patients not receiving anticoagulants (non-therapeutic) and at various levels of therapeutic ranges representing the range of clotting times seen in patients receiving anticoagulants. In certain embodiments, the surrogate whole blood control prepared as described as herein can be used as controls for other whole blood coagulation assays including whole blood PT, ACT or aPTT assays.

Yet another embodiment of the invention is directed to a method of preparing a whole blood control sample system comprising the steps of: (a) providing at least one lyophilizate comprising (i) fixed red blood cells sourced from one or more mammalian species; and plasma sourced from one or more species; (b) providing at least one diluent; (c) providing at least one activation solution, wherein at least one of the lyophilizate, the diluent or activation solution contains a coagulation modulator, and (d) adjusting the concentration of the coagulation modulator to provide a whole blood control system that upon combining measured aliquots of the lyophilizate, diluent and activation solution that results in a whole blood control sample having a defined clotting time. Most preferably, the method comprises providing the coagulation modulator solely in the activation solution.

In yet another embodiment, the invention is directed to the whole blood control sample resulting from the combination of an aliquot of lyophilizate, an aliquot of diluent and an aliquot of activation solution. Advantageously, the whole blood control system can be provided with different concentrations of coagulation modulator, most preferably in the activation solution, so that each resulting whole blood control sample prepared with the system has a different clotting time. Preferably, when using the whole blood control system of the invention, the lyophilizate will be first be mixed with the diluent for a time that allows for substantially full rehydration of the lyophilizate prior to addition of the activation solution.

BRIEF DESCRIPTION OF THE DRAWINGS

The present invention will be more fully understood by reference to the following drawings, which are for illustrative purposes only.

DETAILED DESCRIPTION OF THE INVENTION

Definitions

Figure 1:
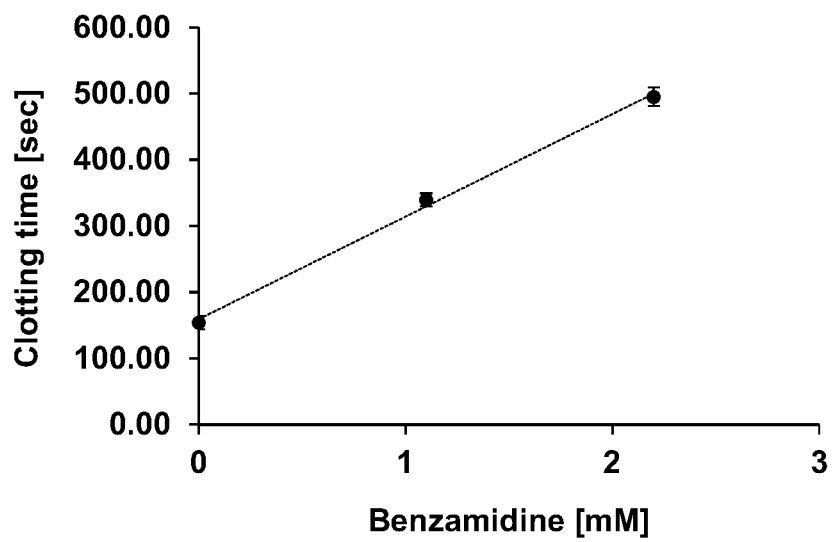
FIG. 1 illustrates that clotting time of the surrogate whole blood control shows linear response to benzamidine concentration in lyophilizate.

As used herein, "fixative" refers to a chemical that fix red blood cells by crosslinking proteins or other molecules on the surface of red blood cells.

As used herein, "activators" refer to reagents that can accelerate the clotting of surrogate whole blood controls.

As used herein, "serine protease inhibitors" refer to family of proteins and small molecules that antagonize the activity of serine proteases.

As used herein, "aliquots" refer to measured amounts of lyophilizate, diluent and activation solution that are combined to provide a whole blood control system.

As used herein, "coagulation modulator" refers to one or more serine protease inhibitors and/or rabbit brain cephalin that are effective to adjust clotting time by varying concentration of the modulator in the whole blood control. Although calcium chloride, which is required in the activation solution, can be varied in concentration to adjust clotting time, calcium chloride is not considered a coagulation modulator as used herein, i.e., the whole blood control system of the present invention must include both calcium chloride and a coagulation modulator.

Preparation

A. Fixed Red Blood Cells

To prepare fixed red blood cells, mammalian red blood cells may be collected by centrifugation and washed by saline to remove residual plasma proteins. The separated red blood cells are fixed with fixatives to prevent lysis of red blood cells upon lyophilization. Glutaraldehyde is a preferred fixative. The fixation time and concentration of glutaraldehyde can be varied to optimize the stability of red blood cells. After fixation, the fixature solution is removed and the fixed red blood cells are washed with saline several times to remove residual fixative. The fixed red blood cells are typically stable upon storage at 4° C. Fixed red blood cells are readily available for purchase.

B. Plasma Base for the Resuspension of Fixed Red Blood Cells

To provide the coagulation factors and fibrinogen needed for the coagulation of surrogate whole blood controls, mammalian plasma from a single species may be used to resuspend fixed red blood cells. Plasma freshly prepared from mammalian whole blood is immediately used to resuspend the fixed red blood cells. Alternatively, freshly prepared mammalian plasma can be frozen immediately after preparation for storage and transportation. Before use, frozen plasma is thawed in a water bath at 37° C. to preserve the activity of coagulation factors. In some embodiments, the plasma base is prepared by mixing plasma from different mammalian species at different mixing ratios to adjust the clotting time of the whole blood control. This is because the plasma from different species have different clotting times. In certain embodiments, activators such as cephalin, thromboplastin or kaolin can be added into plasma base. These activators accelerate the initiation process of coagulation, thereby reducing the clotting time of the surrogate whole blood control. In other embodiments, a coagulation modulator such as a serine protease inhibitor (e.g. benzamidine) is added into the activation solution at different concentrations. Benzamidine inhibits the activity of coagulation factors such as factor Xa and IIa, thereby prolonging the clotting time of the surrogate whole blood control. Significantly, it has been found that by varying the concentration of benzamidine, the clotting time of the resulting surrogate whole blood control can be adjusted to represent the range of clotting times seen in patients receiving different anticoagulants at different doses. If desired, the coagulation modulator may be included in the lyophilizate or even the diluent. Most preferably, however, the coagulation modulator is included in the activation solution.

It should be understood that the whole blood and plasma discussed above is collected into containers with anticoagulants such as citrate in the form of sodium citrate or acid-citrate-dextrose, or EDTA which chelate calcium to disrupt the coagulation cascade and prevent clotting to allow for storage and processing.

C. Activation Solution

Activation solution comprises calcium chloride, which neutralizes sodium citrate in plasma base and leads to activation of clotting of surrogate whole blood controls. In one embodiment, the concentration of calcium chloride is varied to adjust the clotting time of surrogate whole blood controls. In particular embodiments, a serine protease inhibitor (e.g. benzamidine) is added into the activation solution at different concentrations. By varying the concentration of the serine protease inhibitor, the clotting time of the surrogate whole blood control can be adjusted to represent the range of clotting times seen in patients receiving different anticoagulants at different doses.

When preparing the whole blood control system of the invention, generally the ratio of fixed red blood cells to plasma in the lyophilizate will be in a range of about 0.2:0.8 to about 0.5:0.5, preferably about 0.25:0.75 to about 0.45: 0.55, and most preferably about 0.3:0.7 to about 0.4:0.6 by weight. The diluent is generally water and preferably water for injection (WFI). The activation solution will contain calcium chloride generally at a concentration in an amount of about 14 mM to about 40 mM, preferably about 18 mM to about 36 mM, and more preferably about 20 mM to about 30 mM. When the coagulation modulator is a serine protease inhibitor such as benzamidine, which may present in the lyophilizate, diluent or activation solution, more preferably the lyophilizate or activation solution, and most preferably the activation solution, the serine protease inhibitor such as benzamidine will generally be present in a range of about 0.11 mM to about 11 mM, preferably about 0.22 mM to about 8.8 mM, and more preferably about 0.33 mM to about 6.6 mM. When the coagulation modulator is rabbit brain cephalin, which may present in the lyophilizate, diluent or activation solution, more preferably the lyophilizate or activation solution, and most preferably the lyophilizate, the rabbit brain cephalin will generally be present in a range of about 0.048 mg/mL to about 0.96 mg/mL, preferably about 0.096 mg/mL to 0.48 mg/mL and more preferably about 0.1 mg/mL to 0.36 mg/mL.

In one embodiment the whole blood control sample system will include an aliquot of lyophilizate, an aliquot of diluent and an aliquot of activation solution which are mixed together prior to introduction into the coagulometer. Preferably the lyophilizate is added first to the diluent and then the activation solution is added to the mixture after the lyophilizate is substantially rehydrated by the diluent. Typically, the ratio of lyophilizate to diluent to activation solution will be in a range of about 1:0.2:0.8 to about 1:0.8:0.2, preferably about 1:0.3:0.7 to about 1:0.7: 0.3, most preferably 1:0.4:0.6 to about 1:0.6:0.4 by volume. It should be understood that each aliquot of lyophilizate, diluent and activation solution of the whole blood control sample system may be supplied in a separate container that is meant to be mixed at the time of use to provide a whole blood control system. It would also be possible to provide a single container with three separate compartments that had means to cause all three compartments to mix. In one embodiment of the invention, the whole blood control sample system will contain two aliquots of lyophilizate, two aliquots of diluent and two aliquots of activation solution, with the concentration of coagulation modulator that is either in the lyophilizate, diluent or activation solution being different so that upon combination of an aliquot of each of the lyophilizate, diluent and activation solution, the resulting clotting time of the resulting whole blood control system from one combination is different than that of the other combination. In another embodiment, the whole blood control sample system may include 3, or 4 or 5 or more of each aliquot of lyophilizate, diluent and activation solution, with each combination having a different concentration of coagulation modulator. Preferably, the whole blood control system having a plurality of aliquots of lyophilizate, diluent and activation solutions will have the coagulation modulator present in the activation solution and not present in the lyophilizate and diluent. Such whole blood control systems are preferably provided as a kit with instructions for mixing the lyophilizate, diluent and activation solution. When the coagulation modulator is present in activation solution it is preferable to first mix the lyophilizate and diluent, followed by introduction of the activation solution.

Typically the difference in the amount of coagulation modulator, such as benzamidine, in each whole blood control system that has more than one aliquot of each of lyophilizate, diluent and activation solution will be about 0.55 mM to about 4.4 mM, preferable about 1.1 mM to about 3.3 mM, most preferably about 1.1 mM to about 2.2 mM.

In a particularly preferred embodiment, having multiple activation solutions with differing coagulation modulator concentrations allows for each system to employ a single lyophilizate and single diluent, i.e., where each aliquot of lyophilizate in the whole blood control system is identical and each aliquot of diluent in the whole blood control system is identical. Multiple activation solutions in the system advantageously allows for a range of resulting clotting times. Additionally, with coagulation activator in the activation solution being separate from the diluent, more time is allowed after the addition of the diluent to the lyophilizate providing for a more complete and consistent rehydration of the lyophilizate. This provides a significant advantage compared to existing coagulation controls which have a single diluent with activator in the diluent, and so, must be introduced to the measuring instrument quickly after reconstitution. In particular, the above described invention wherein the whole blood control system is provided as three separate components, i.e., lyophilizate, diluent and activation solution, provides a whole blood control system that has improved accuracy and precision over prior art systems because of the ability to achieve a more complete and consistent rehydration of the lyophilizate.

In yet another embodiment of the invention, the whole blood control sample system of this invention consists essentially of: (a) a single lyophilizate comprising, (i) fixed red blood cells sourced from one or more mammalian species; (ii) and plasma sourced from one or more mammalian species; (b) a single diluent; (c) and at least one activation solution, wherein the lyophilizate and diluent are substantially free of coagulation activator. Preferably, the activation solution further comprises a coagulation modulator. The absence of coagulation activator from the lyophilizate and diluent allows for a more consistent and complete rehydration of the lyophilizate with diluent prior to addition of the activation solution when preparing the whole blood control samples.

EXAMPLES

Example 1. Adjusting the Surrogate Whole Blood Control Clotting Time by Using Plasma Base Prepared with Plasma from Different Mammalian Species at Different Mixing Ratios Plasma was prepared by mixing sheep plasma and horse plasma at different mixing ratios of 9:1, 7:3, 3:7 and 1:9. Plasma base was further prepared by mixing 70% (w/v) plasma, 18% (w/v) sheep fibrinogen solution (45.72 mg/mL in 20 mM sodium citrate-HCl, pH 7.4), and 12% (w/v) saline. Whole blood control, containing 35% (w/v) glutaraldehyde-fixed horse red blood cells and 65% (w/v) plasma base, was recalcified by 0.2 M calcium chloride at the volume ratio of 17:1, and the samples were tested on Perosphere Technologies' PoC Coagulometers immediately. As shown in Table 1, a higher percentage of horse plasma resulted in a longer clotting time.

TABLE 1

Effect of sheep/horse plasma mixing ratio on the clotting time of surrogate whole blood control.

| Fixed horse red blood cells | Sheep/horse plasma mixing ratio | Clotting time (sec) | Standard deviation (sec) |
|---|---|---|---|
| 1% glutaraldehyde-fixed | 9:1 | 343.67 | 5.86 |
|  | 7:3 | 354.33 | 12.58 |
|  | 3:7 | 371.67 | 16.17 |
| 2% glutaraldehyde-fixed | 9:1 | 392.00 | 16.97 |
|  | 1:9 | 493.67 | 9.45 |

Example 2. Adjusting the Clotting Time of Surrogate Whole Blood Control by Varying the Concentration of Benzamidine in the Lyophilizate Plasma was prepared by mixing sheep plasma and horse plasma at a mixing ratio of 1:9. Sheep fibrinogen solution (45.72 mg/mL in 20 mM sodium citrate-HCl, pH 7.4) was diluted to 40 mg/mL with saline. Plasma base was further prepared by mixing 77% (w/v) plasma and 23% (w/v) sheep fibrinogen solution (40 mg/mL). Whole blood control was prepared by resuspending 35% (w/v) 2% glutaraldehyde-fixed horse red blood cells in 65% (w/v) plasma base, with addition of rabbit brain cephalin to a final concentration of 0.144 mg/mL. Benzamidine of varying concentrations were added to the preparation. The whole blood control was then freeze-dried in glass vials. To test the effect of benzamidine in lyophilizate on clotting time, the freeze-dried surrogate whole blood control was reconstituted in a diluent solution to half of its original volume, incubated at room temperature for 6 minutes, and mixed by swirling the glass vial gently for an additional 1 minute. The control was then activated by addition of 22 mM calcium chloride at the volume ratio of 1:1, followed by six times of rapid inversion. The samples were tested on Perosphere Technologies' PoC Coagulometers immediately after activation. As shown in Table 2, the clotting time increased with the increase in benzamidine concentration and the dose-response curve was linear (FIG. 1).

TABLE 2

Effect of benzamidine concentration in lyophilizate on the clotting time of surrogate whole blood control.

| Benzamidine concentration in lyophilizate (mM) | Clotting time (sec) | Standard deviation (sec) |
|---|---|---|
| 0 | 154.33 | 10.07 |
| 1.1 | 339.33 | 10.02 |
| 2.2 | 495.00 | 14.11 |

As illustrated in FIG. 1, the clotting time of surrogate whole blood control showed a linear response to the benzamidine concentration in lyophilizate.

Example 3. Adjust the Whole Blood Control Clotting Time by Varying the Calcium Chloride Concentration in Activation Solution Plasma was prepared by mixing sheep plasma and horse plasma at a mixing ratio of 1:9. Sheep fibrinogen solution (45.72 mg/mL in 20 mM sodium citrate-HCl, pH 7.4) was diluted to 40 mg/mL by saline. Plasma base was further prepared by mixing 77% (w/v) plasma and 23% (w/v) sheep fibrinogen solution (40 mg/mL). Whole blood control was prepared by resuspending 35% (w/v) 2% glutaraldehyde-fixed horse red blood cells in 65% (w/v) plasma base, with addition of rabbit brain cephalin to a final concentration of 0.144 mg/mL. The whole blood control was then freeze-thawed once and freeze-dried in glass vials. To test the effect of calcium chloride concentration in activation solution on clotting time, the freeze-dried surrogate whole blood control was reconstituted in a diluent solution to half of its original volume, incubated at room temperature for 6 minutes, and mixed by swirling the glass vial gently for an additional 1 minute. The control was then activated by addition of calcium chloride solution of varying concentrations at the volume ratio of 1:1, followed by six times of rapid inversion. The samples were tested on Perosphere Technologies' PoC Coagulometers immediately after activation. As shown in Table 3, the clotting time can be adjusted by varying the concentration of calcium chloride in activation solution.

TABLE 3

Effect of $CaCl_2$ concentration in activation solution on the clotting time of surrogate whole blood control.

| $CaCl_2$ concentration in activation solution (mM) | Clotting time (Sec) | Standard deviation (sec) |
|---|---|---|
| 14 | 199.00 | 10.54 |
| 22 | 154.00 | 8.54 |
| 30 | 166.00 | 8.54 |
| 40 | 203.33 | 10.07 |

Example 4: Adjusting the Clotting Time of Surrogate Whole Blood Controls by Varying Benzamidine Concentration in Activation Solution Plasma was prepared by mixing sheep plasma and horse plasma at a mixing ratio of 1:9. Sheep fibrinogen solution (45.72 mg/mL in 20 mM sodium citrate-HCl, pH 7.4) was diluted to 40 mg/mL with saline. Plasma base was further prepared by mixing 77% (w/v) plasma and 23% (w/v) sheep fibrinogen solution (40 mg/mL). Whole blood control was prepared by resuspending 35% (w/v) 3% glutaraldehyde-fixed horse red blood cells in 65% (w/v) plasma base, with addition of rabbit brain cephalin to a final concentration of 0.144 mg/mL. The whole blood control was then freeze-thawed once and freeze-dried in glass vials. To test the effect of benzamidine concentration in activation solution on clotting time, the freeze-dried surrogate whole blood control was reconstituted in a diluent solution to half of its original volume, incubated at room temperature for 6 minutes, and mixed by swirling the glass vial gently for an additional 1 minute. The control was then activated by addition of an activation solution containing 22 mM $CaCl_2$) and varying concentrations of benzamidine at the volume ratio of 1:1, followed by six times of rapid inversion. The samples were tested on Perosphere Technologies' PoC Coagulometers immediately after activation. As shown in Table 4, the clotting time demonstrated a linear response to the benzamidine concentration in activation solution.

TABLE 4

Effect of benzamidine concentration in activation solution on the clotting time of surrogate whole blood control

| Benzamidine concentration in activation solution (mM) | Clotting time (sec) | Standard deviation (sec) |
|---|---|---|
| 0 | 149.67 | 7.51 |
| 1.1 | 206.00 | 8.72 |
| 2.2 | 249.00 | 6.56 |
| 4.4 | 357.67 | 8.33 |
| 6.6 | 422.50 | 0.71 |

Figure 2:
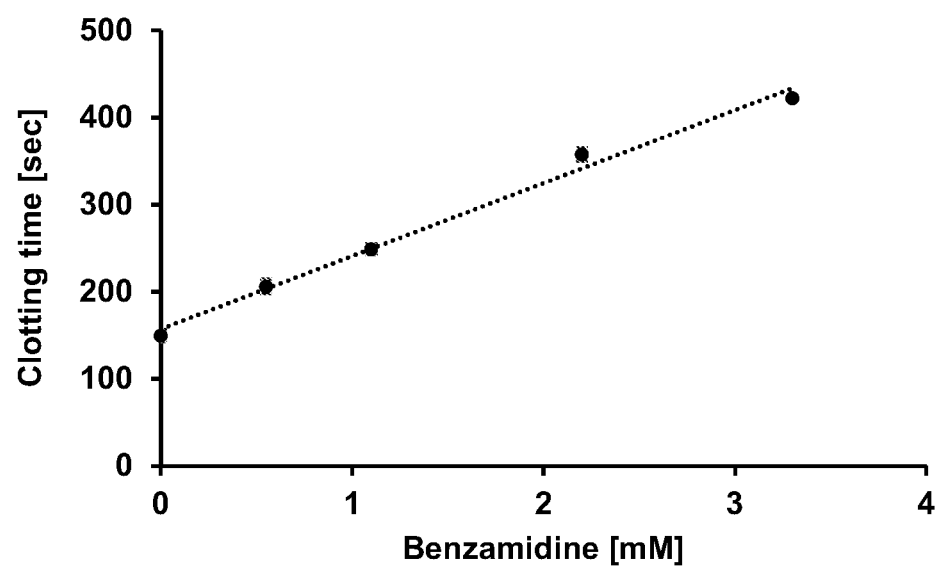
FIG. 2 illustrates that clotting time of surrogate whole blood control shows linear response to benzamidine concentration in activation solution.

FIG. 2 illustrates that the clotting time of surrogate whole blood control shows a linear response to the benzamidine concentration in activation solution.

Example 5: Adjusting the Clotting Time of Surrogate Whole Blood Controls by Adding Rabbit Brain Cephalin Plasma was prepared by mixing sheep plasma and horse plasma at a mixing ratio of 1:9. Sheep fibrinogen solution (45.72 mg/mL in 20 mM sodium citrate-HCl, pH 7.4) was diluted to 40 mg/mL by saline. Plasma base was further prepared by mixing 77% (w/v) plasma and 23% (w/v) sheep fibrinogen solution (40 mg/mL). Whole blood control, containing 35% (w/v) glutaraldehyde-fixed horse red blood cells and 65% (w/v) plasma base with or without addition of rabbit brain cephalin to a final concentration of 0.144 mg/mL, was recalcified by 0.2 M calcium chloride at the volume ratio of 17:1, and the samples were tested on Perosphere Technologies' PoC Coagulometers immediately. As shown in Table 5, the addition of rabbit brain cephalin led to significantly reduced clotting times.

TABLE 5

Effect of adding rabbit brain cephalin on the clotting time of surrogate whole blood control.

| Fixed horse red blood cells | Rabbit brain cephalin final concentration (mg/mL) | Clotting time (sec) | Standard deviation (sec) |
|---|---|---|---|
| 2% glutaraldehyde-fixed | 0 | 493.67 | 9.45 |
|  | 0.144 | 307.67 | 7.51 |
| 3% glutaraldehyde-fixed | 0 | 492.00 | 29.87 |
|  | 0.144 | 302.00 | 11.27 |

Example 6: Preparing Activator Solutions Containing Varying Concentrations of Benzamidine to Meet Whole Blood Liquid Control Clotting Time Ranges Four activator solutions were prepared having the following constituents: 1). 0 mM benzamidine, 22 mM $CaCl_2$ in saline; 2) 2.5 mM benzamidine, 22 mM $CaCl_2$) in saline; 3) 5 mM benzamidine, 22 mM $CaCl_2$) in saline; and 4) 10 mM benzamidine, 22 mM $CaCl_2$ in saline.

DI water was used as a diluent solution. Lyophilized whole blood controls were reconstituted by adding 0.5 mL of the diluent to each control and incubating the controls at room temperature for 6 minutes. Each vial was swirled for a minute to ensure reconstitution and then 0.5 ml of each of the activator solutions described above were individually added to separate vials of the reconstituted whole blood controls. The vials were closed and shaken before loading each sample on three Perosphere Technologies PoC coagulometers. The mean value of clotting time for each of the four activators described above was determined and the mean clotting times were plotted against the benzamidine concentration in each activator. Using the equation defined by the resulting plot, the benzamidine concentration for four clotting time ranges described below were calculated.

The clotting time ranges used were as follows: Level 1 range of 150-250 seconds clotting time; Level 2 range of 220-320 seconds clotting time; Level 3 range of 290-390 seconds clotting time; and Level 4 range of 370-470 seconds clotting time. Four activator solutions were then prepared by weighing the appropriate amount of benzamidine based on the equation calculated above so that each individual solution provides a clotting time for each desired level. One liter of each activator solution (Level 1, 2, 3 and 4) was prepared with the calculated amount of benzamidine and also containing 22 mM $CaCl_2$).

REFERENCES

1. A novel whole blood point-of-care coagulometer to measure the effect of direct oral anticoagulants and heparins. Semin Thromb Hemost. 2019, 45(3):259-263.
2. Studies on the chemistry of blood coagulation. III. The chemical constituents of blood platelets and their role in blood clotting, with remarks on the activation of clotting by lipids. J. biol. Chem. 1936, 116, 237.
3. Comparative Studies on the Inhibition of Trypsin, Plasmin, and Thrombin by Derivatives of Benzylamine and Benzamidine, European J. Biochem. 6 (1968) 502-506.

What is claimed is:
1. A whole blood control sample system comprising as separate components:
   a. at least one lyophilizate comprising:
      i. fixed red blood cells sourced from one or more mammalian species;

ii. plasma sourced from one or more mammalian species; and
iii. an anticoagulant selected from the group consisting of sodium citrate, acid-citrate-dextrose, and EDTA;
b. at least one diluent; and
c. at least one activation solution comprising a coagulation activator that is calcium chloride,
wherein at least one of the at least one lyophilizate, the at least one diluent, and the at least one activation solution contains a coagulation modulator,
wherein the at least one lyophilizate and the at least one diluent are substantially free of the coagulation activator, and
wherein the coagulation modulator is a serine protease inhibitor and/or rabbit brain cephalin.

2. The whole blood control sample system of claim 1, wherein the coagulation modulator is the serine protease inhibitor.

3. The whole blood control sample system of claim 2, wherein the serine protease inhibitor is benzamidine.

4. The whole blood control sample system of claim 1, wherein the coagulation modulator is present in the at least one activation solution and is not present in the at least one diluent and the at least one lyophilizate.

5. The whole blood control sample system of claim 4, wherein the system comprises two or more activation solutions, with each activation solution having a different coagulation modulator concentration, a single lyophilizate, and a single diluent.

6. The whole blood control sample system of claim 5, wherein the system is provided as a kit having two or more aliquots of activation solution, two or more aliquots of lyophilizate and two or more aliquots of diluent.

7. The whole blood control sample system of claim 5, wherein the system comprises two activation solutions.

8. The whole blood control sample system of claim 7, wherein the system is provided as a kit having two aliquots of activation solution, two aliquots of lyophilizate and two aliquots of diluent.

9. The whole blood control sample system of claim 1, wherein the coagulation modulator is present in the at least one lyophilizate and is not present in the at least one diluent and the at least one activation solution.

10. The whole blood control sample system of claim 9, wherein the system comprises two or more lyophilizates, with each lyophilizate having a different coagulation modulator concentration, a single diluent, and a single activation solution.

11. The whole blood control sample system of claim 10, wherein the system is provided as a kit having two or more aliquots of activation solution, two or more aliquots of lyophilizate and two or more aliquots of diluent.

12. The whole blood control sample system of claim 10, wherein the system comprises two lyophilizates.

13. The whole blood control sample system of claim 12, wherein the system is provided as a kit having two aliquots of activation solution, two aliquots of lyophilizate and two aliquots of diluent.

14. The whole blood control sample system of claim 1, wherein either the at least one lyophilizate or the at least one activation solution includes an effective amount of the rabbit brain cephalin to further modulate clotting time of the whole blood control sample system.

15. A method of preparing a whole blood control sample system comprising steps of: providing as separate components:
a. at least one lyophilizate comprising:
i. fixed red blood cells sourced from one or more mammalian species;
ii. plasma sourced from one or more species; and
iii. an anticoagulant selected from the group consisting of sodium citrate, acid-citrate-dextrose, and EDTA;
b. at least one diluent;
c. at least one activation solution comprising a coagulation activator that is calcium chloride;
wherein at least one of the at least one lyophilizate, the at least one diluent, and the at least one activation solution contains a coagulation modulator,
wherein the at least one lyophilizate and the at least one diluent are substantially free of the coagulation activator, and
wherein the coagulation modulator is a serine protease inhibitor and/or rabbit brain cephalin;
adjusting a concentration of the coagulation modulator to provide a whole blood control sample having a defined clotting time; and
mixing an aliquot of the at least one lyophilizate with an aliquot of the at least one diluent to rehydrate the at least one lyophilizate and then adding an aliquot of the at least one activation solution to the rehydrated at least one lyophilizate to provide a whole blood control sample.

16. The method of claim 15, wherein the coagulation modulator is the serine protease inhibitor.

17. The method of claim 16, wherein the serine protease inhibitor is benzamidine.

18. The method of claim 15, wherein the coagulation modulator is present in the at least one activation solution.

19. The method of claim 18, wherein at least two identical lyophilizate aliquots are provided and at least two activation solutions are provided, wherein each activation solution contains a different coagulation modulator amount so as to provide a different clotting time, when an aliquot of lyophilizate, diluent, and activation solution are combined.

20. The method of claim 19, wherein the system contains two identical lyophilizate aliquots, two identical diluents aliquots, and two aliquots of activation solution, each of the two aliquots of activation solution having a different coagulation modulator concentration.

21. The method of claim 15, wherein the coagulation modulator is present in the at least one lyophilizate.

22. The method of claim 21, wherein at least two identical activation solution aliquots are provided and at least two lyophilizate aliquots are provided, wherein each aliquot of lyophilizate contains a different coagulation modulator amount so as to provide a different clotting time, when an aliquot of lyophilizate, diluent, and activation solution are combined.

23. The method of claim 22, wherein the system contains two identical aliquots of activation solution, two identical diluent aliquots, and two lyophilizate aliquots, each of the two lyophilizate aliquots having a different coagulation modulator concentration.

* * * * *